United States Patent [19]

Nielsen

[11] 4,372,749

[45] Feb. 8, 1983

[54] METHOD FOR THE MANUFACTURING OF FUEL BRIQUETTES

[76] Inventor: Flemming S. Nielsen, 39, Strandparken, Himmelev, Denmark

[21] Appl. No.: 114,559

[22] Filed: Jan. 23, 1980

[30] Foreign Application Priority Data

Jan. 30, 1979 [DK] Denmark .............................. 380/79

[51] Int. Cl.³ ........................... C10L 5/46; C10L 5/06
[52] U.S. Cl. ...................................... 44/1 D; 44/10 A
[58] Field of Search ................................ 44/1 D, 10 A

[56] References Cited

U.S. PATENT DOCUMENTS

| 128,478 | 7/1872 | Fleischmann | 44/10 A |
| 1,219,178 | 3/1917 | Smirk | 44/10 A |
| 4,152,119 | 5/1979 | Schultz | 44/1 D |
| 4,164,396 | 8/1979 | Jones | 44/1 D |

*Primary Examiner*—Carl F. Dees
*Attorney, Agent, or Firm*—Kenyon & Kenyon

[57] ABSTRACT

A method for manufacturing fuel briquettes from selected components of garbage which are comminuted and combined with coal dust. The mixture of comminuted garbage and coal dust is compressed in a press so as to form a solid body. The proportion of coal dust in the mixture is advantageously adjusted in response to the amount of power which is drawn by a motor which drives the press. In one embodiment, the weight of the coal dust forms at least 20% of the weight of the briquette. The press may be provided with pressing wheels which may be used to comminute the refuse.

3 Claims, 1 Drawing Figure

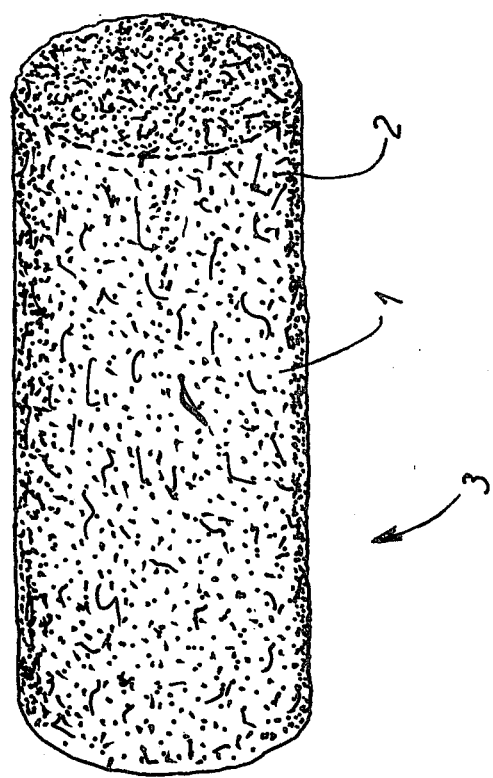

METHOD FOR THE MANUFACTURING OF FUEL BRIQUETTES

BACKGROUND OF THE INVENTION

The invention relates to a method for manufacturing fuel briquettes from refuse such as garbage, whereby the refuse is sorted so as to separate out the components thereof which are to be used for briquettes.

The increase in affluence has resulted in problems for society regarding the handling and treatment of the steadily increasing amount of garbage. This has generated environmental problems which include the pollution of land when storing the garbage, and airpollution when combusting the garbage. Refuse from garbage consists of inflammable and non-inflammable components. The non-inflammable parts are largely iron and glass, and comprise about 5 weight% of the garbage. The rest, about 95 weight%, is usually combusted in a refuse incinerator where a large amount of primary fuel has to be added in order to combust the often moisty and nonhomogenous garbage. The result is a low heating efficiency, partly because diversified garbage is difficult to burn, and partly because the garbage is currently burned without considering the heat which is gained from the combustion in the form of steam in district heating plants.

Since garbage can not be directly stored for a long period without putrefying, it has to be burned off immediately upon collection. Thus, the heat from the district heating plant is not utilized optimally outside the heating season, resulting in waste of heat. In addition, the garbage must be brought to a refuse destructor plant which is connected to a district heating plant in order to utilize the calorific value for district heating.

English Pat. No. 1.286.532 describes a method for manufacturing fuel briquettes from garbage. By this method, metal pieces and dust are first removed, and the garbage is crushed into smaller pieces which are thereafter dried. The dried, comminuted garbage is mixed with crushed coal, and a binding material is added prior to the briquetting. After this procedure, the briquettes must be heat-treated for up to 3 hours at a temperature range of about 200° C. before they are ready for use as fuel briquettes.

SUMMARY OF THE INVENTION

It is an object of the invention to improve the known method. This is achieved by a method whereby the components of the garbage which are to be used for briquettes are comminuted, and coal dust is admixed. The mixture is compressed to the formation of fuel briquettes. By this procedure, the garbage is transformed into fuel briquettes in a much simpler and more economic way because it is not necessary at all to heat the garbage before pressing. Also, a binding material is unnecessary. Since the coal content is evenly distributed in the briquettes, a uniform combustion and a high heat evolution is obtained. This enables an efficient combustion of even hard combustible components and reduces atmospheric pollution. It is a further, surprising feature of this invention that the coal admixture and the heat gained from the briquetting procedure provides excellent dehydration of moisty components without the need for using special heating before, and after producing the briquettes. Putrefaction of the organic parts is prevented, which makes it possible to store the briquettes and thus make them suitable as regular fuel. Consequently, a large amount of energy is saved during the production of briquettes, and it is possible to produce fuel briquettes from garbage is found by the use of simple means.

By pressing the briquettes in a pellet press, high density storable briquettes are obtained. When a fodder pellet press is used, the coal admix ensures that the steam which is produced during the pressing of moisty garbage can be absorbed in the coal and subsequently released to the atmosphere so that steam accumulations in the pressroom are completely avoided, and the briquettes are thoroughly compacted. Furthermore, the comminution of garbage takes place by the pressure of the pressing wheels in the press, which means that a comminution step is unnecessary.

In one embodiment, the coal admixture is regulated so that an appropriate distribution of the coal quantity is obtained in response to the composition of the garbage. In the case of very moist garbage, which means reduced power consumption of the press motor, more coal has to be added than in the case of dry garbage. Steam may be added to the mixture prior to the compression in order to obtain a swift compression of the briquettes and a homogeneous binding of each briquette.

The coal admixture should constitute 20 weight% or more to ensure that each fuel briquette has suitably high calorific value and physical quality.

BRIEF DESCRIPTION OF THE DRAWING

In the following, the invention will be further described with reference to the drawing, in which a single fuel briquette is presented in perspective and manufactured according to the method of the invention.

DETAILED DESCRIPTION

The FIGURE shows an embodiment of a fuel briquette 3 manufactured in accordance with the inventive method. The components of the briquettes are comminuted garbage 1, and coal particles 2. The coal particles 2 are evenly distributed throughout the whole briquette, as shown.

After being collected in sacks, the garbage is placed in waste receivers. From there, the garbage is driven through a pair of knives which tear open the sacks and loosen the garbage. A first sorting of the garbage is then made eliminating iron and other kinds of metal in a known way. After sorting, the garbage may undergo an additional sorting step with a view toward recycling components such as glass and plastics.

The rest of the garbage, which is to be used for briquettes, is mixed with coal dust in a quantity of at least 20 weight% of the garbage. Experiments have shown that 30% is a suitable coal quantity. This mixture is led to a pellet press to be comminuted and pressed together into fuel briquettes. If required, steam may be conducted to the mixture in a known way, prior to the pressing. The amount of coal dust and steam, if any, can be controlled in response to the power consumption of the press motor so as to maintain a correct proportion between the coal content and moistness of the composition with respect to variations in the components of the garbage. This results in a homogeneously high calorific value which, in tests, has proved to be about 4500 kcal/kg.

The diameter of the openings in the matrix in the press produces small briquettes which allow a high density during storage. This makes it economical to store and transport the briquettes.

As mentioned, the fuel briquettes can be manufactured in an ordinary pellet press, e.g. of the ring matrix type. The coal dust admixture prevents steam accumulations because the steam is absorbed in the coal and distributed to the atmosphere. Furthermore, it has been shown that even organic components are effectively prevented from putrefaction by the coal dust admixture and the heating which arises during the briquette production in the press, thereby making the briquettes suitable for long-term storage. Thus, production of fuel outside the heating season is possible at places with plants for the manufacturing of briquettes. In this way the briquettes can be used as fuel wherever the necessary equipment for firing is installed. This method results in substantial fuel-savings, and permits the hygienic and odourless preservation of garbage. The combustible parts of the garbage constitute, for the time being, about 60% of the garbage, and it is anticipated that this percentage will rise in the near future owing to the increase in the consumption of paper and cardboard.

The calorific value of fuel briquettes which have been manufactured in accordance with this method will, therefore, rise in the future so that further savings will be obtained.

The method according to the invention is obviously not limited to the use in connection with refuse from garbage collection. Fuel briquettes according to the invention may thus be manufactured from other kinds of combustible waste such as different kinds of industrial waste, forestry and sawmill refuse, wastepaper, and agricultural waste in the form of straw, chaffs, etc. Thus, the drawing and descriptions of the invention in this disclosure should be viewed as illustrative, and not in a limiting sense.

I claim:

1. A method for manufacturing fuel briquettes from refuse, the refuse consisting of preselected components of garbage which are comminuted and mixed with coal dust to form a mixture, the mixture being compressed in a press to form a solid body, the method being CHARACTERIZED IN THAT the amount of coal dust which is added to the comminuted refuse is controlled in response to the amount of power which is drawn by a motor which drives the press.

2. The method of claim 1 wherein at least 20% of the weight of the solid body consists of coal dust.

3. The method of claim 1 wherein the press is provided with pressing wheels, the step of comminuting the refuse being performed by said pressing wheels.

* * * * *